(12) United States Patent
Chen

(10) Patent No.: US 7,051,622 B1
(45) Date of Patent: May 30, 2006

(54) TIRE-PATCHING TOOL

(76) Inventor: Ting-Yuan Chen, No. 230, Jinn Shin Road, Taya Hsiang, Taichung Hsien (TW)

( * ) Notice: Subject to any disclaimer, the term of this patent is extended or adjusted under 35 U.S.C. 154(b) by 0 days.

(21) Appl. No.: 11/029,588

(22) Filed: Jan. 5, 2005

(51) Int. Cl.
*B29C 73/08* (2006.01)

(52) U.S. Cl. .................. 81/15.7; 81/15.2; 81/15.5

(58) Field of Classification Search ............. 81/15.7, 81/177.2, 63.2, 60, 584, 15.2, 15.5, 15.6; 254/126

See application file for complete search history.

(56) References Cited

U.S. PATENT DOCUMENTS

| | | | | |
|---|---|---|---|---|
| 2,814,277 A | * | 11/1957 | Jimerson | 173/176 |
| 3,073,191 A | * | 1/1963 | Sharpe | 81/15.7 |
| 3,083,597 A | * | 4/1963 | Thomas | 81/15.7 |
| 3,250,156 A | * | 5/1966 | Thomas | 81/15.7 |
| 3,257,875 A | * | 6/1966 | Chambers | 81/15.7 |
| 4,092,012 A | * | 5/1978 | Ishigami | 254/126 |
| 4,370,906 A | * | 2/1983 | Gurries | 81/464 |
| 4,811,636 A | * | 3/1989 | Okura | 81/63.2 |
| 5,005,448 A | * | 4/1991 | Main | 81/63 |
| 5,802,691 A | * | 9/1998 | Zoltaszek | 29/243.526 |
| 5,950,990 A | * | 9/1999 | Castillo | 254/126 |
| 6,334,605 B1 | * | 1/2002 | Kikuchi | 254/126 |

OTHER PUBLICATIONS

Taiwan Patent Publication No. 509141, Nov. 1, 2002, 5 pages.

* cited by examiner

*Primary Examiner*—Lee D. Wilson
*Assistant Examiner*—Alvin J Grant
(74) *Attorney, Agent, or Firm*—Alan D. Kamrath; Nikolai & Mersereau, P.A.

(57) ABSTRACT

A tire-patching tool for patching a tire includes a shell, a barrel, a patch feeder, an elastic element, a hammer and an automatic valve. The barrel is connected with the shell. The patch feeder includes a first end inserted in the barrel and a second end for feeding a patch into a cut in the tire. The elastic element connects the patch feeder with the barrel. The hammer strikes the first end of the patch feeder in the barrel. The automatic valve is installed in the shell for controlling pressurized air for driving the hammer.

18 Claims, 8 Drawing Sheets

TIRE-PATCHING TOOL

BACKGROUND OF INVENTION

1. Field of Invention

The present invention relates to a tire-patching tool.

2. Related Prior Art

According to Taiwanese Patent Publication No. 509141, a conventional tire-patching tool includes a handle 10 and a drill 20 extending from the handle 10. The drill 20 includes a point 21, a plurality of threads 31, 32, 33 and 34 formed thereon near the point 21 and a notch 22 defined therein near the threads 31, 32, 33 and 34. In use, a rubber band 40 is put in the notch 22. The rubber band 40 is dipped in glue. The point 21 is inserted in a cut in a tire T. The threads 31, 32, 33 and 34 are driven through the cut. Accordingly, the portion of the drill 20 in which the notch 22 is defined is inserted into the cut so that the rubber band 40 is brought into the cut, folded. The drill 20 is pulled from the tire T. Because of the notch 22, the rubber band 40 is left in the cut. Because of the glue, the rubber band 40 is adhered to the tire T. Thus, the tire T is patched. However, the cut is inevitably enlarged while the threads 31, 32, 33 and 34 are driven into the tire T. That is, the tire T is further damaged before it gets patched.

In an alternative manner, the tire T is removed from a rim (not shown). The internal side of the tire T around the cut is around. A flat patch (not shown) can be adhered to the internal side of the tire T around the cut. Thus, the tire T is patched. It is, however, troublesome to remove the tire T from the rim. Moreover, the internal side of the tire T is ground, i.e., the tire T is further damaged before it gets patched.

The present invention is therefore intended to obviate or at least alleviate the problems encountered in the prior art.

SUMMARY OF INVENTION

According to the present invention, a tire-patching tool includes a shell, a barrel, a patch feeder, an elastic element, a hammer and an automatic valve. The barrel is connected with the shell. The patch feeder includes a first end inserted in the barrel and a second end for feeding a patch into a cut in the tire. The elastic element connects the patch feeder with the barrel. The hammer strikes the first end of the patch feeder in the barrel. The automatic valve is installed in the shell for controlling pressurized air for driving the hammer.

The primary advantage of the tire-patching tool of the present invention is that it does not cause any damage to the tire. Another advantage of the tire-patching tool of the present invention is convenience in use.

Other objects, advantages and novel features of the invention will become more apparent from the following detailed description in conjunction with the attached drawings.

BRIEF DESCRIPTION OF DRAWINGS

The present invention will be described through detailed illustration of embodiments referring to the drawings.

DETAILED DESCRIPTION OF EMBODIMENTS

The tire-patching tool will be described through illustration of a first embodiment shown in FIGS. 1 to 6 and a second embodiment shown in FIGS. 7 and 8. According to the first embodiment, the tire-patching tool is a pneumatic type. According to the second embodiment, the tire-patching tool is an electric type.

Figure 1:
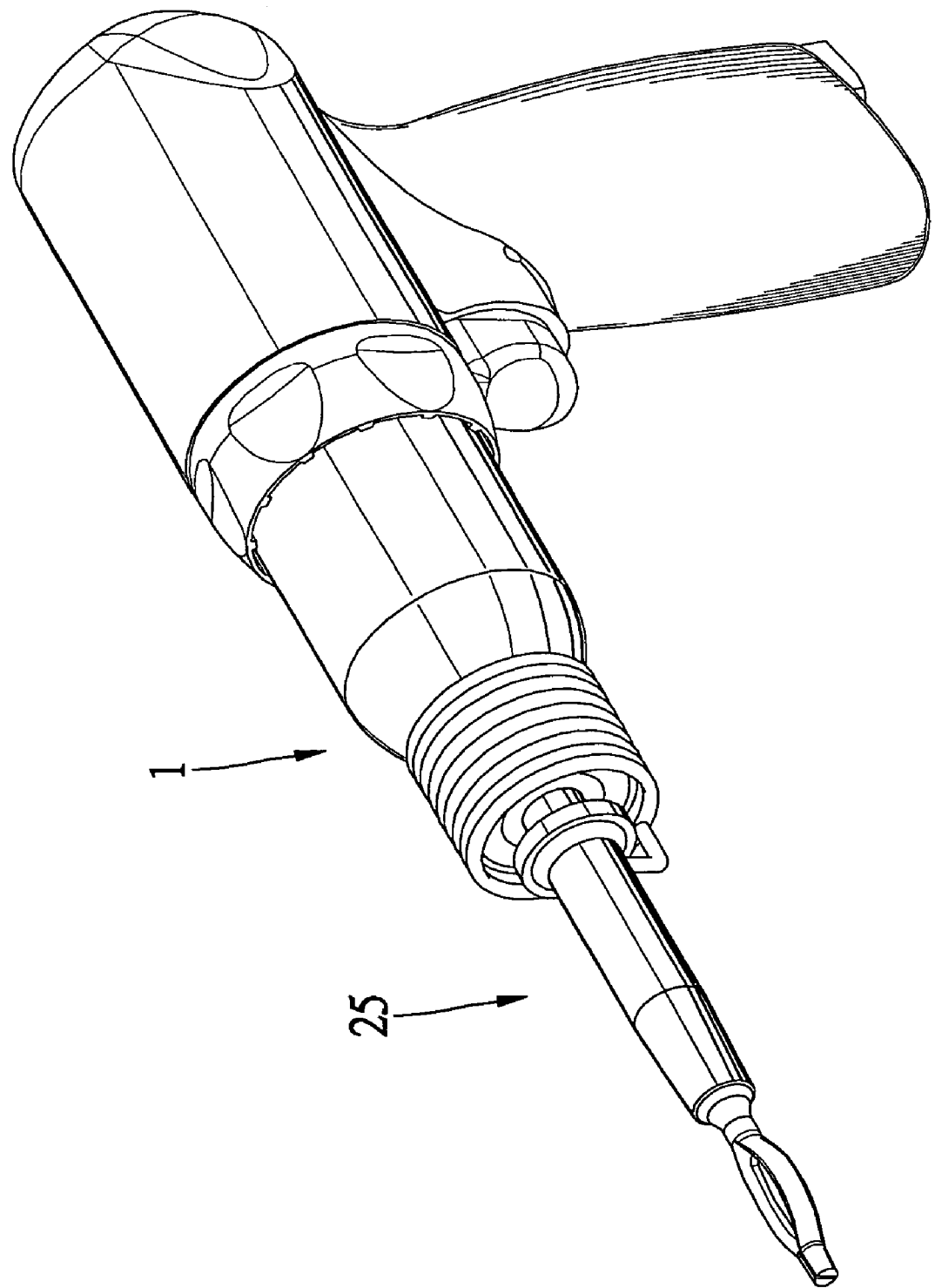
FIG. 1 is a perspective view of a tire-patching tool according to a first embodiment of the present invention.
Figure 2:
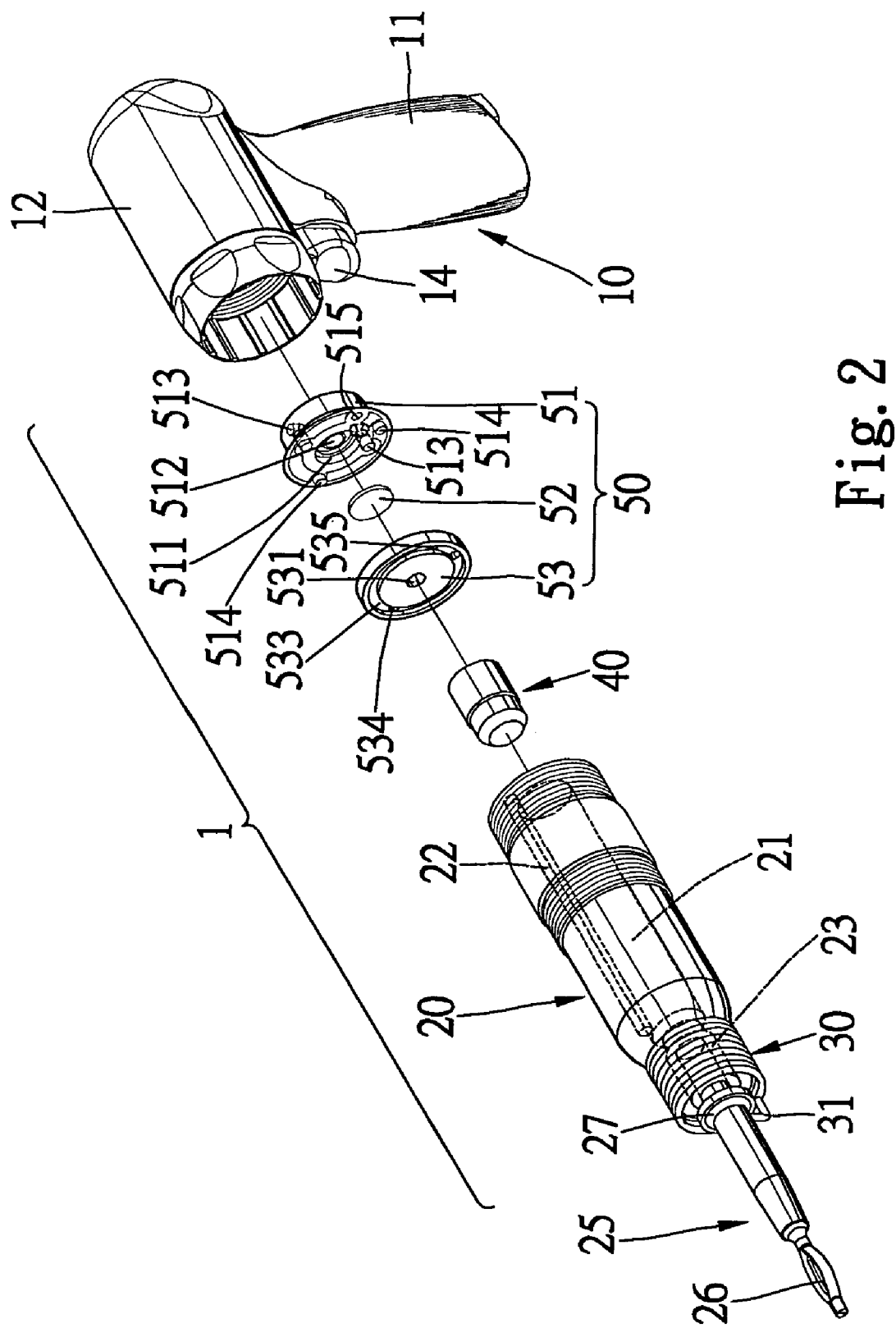
FIG. 2 is an exploded view of the tire-patching tool shown in FIG. 1.
Figure 3:
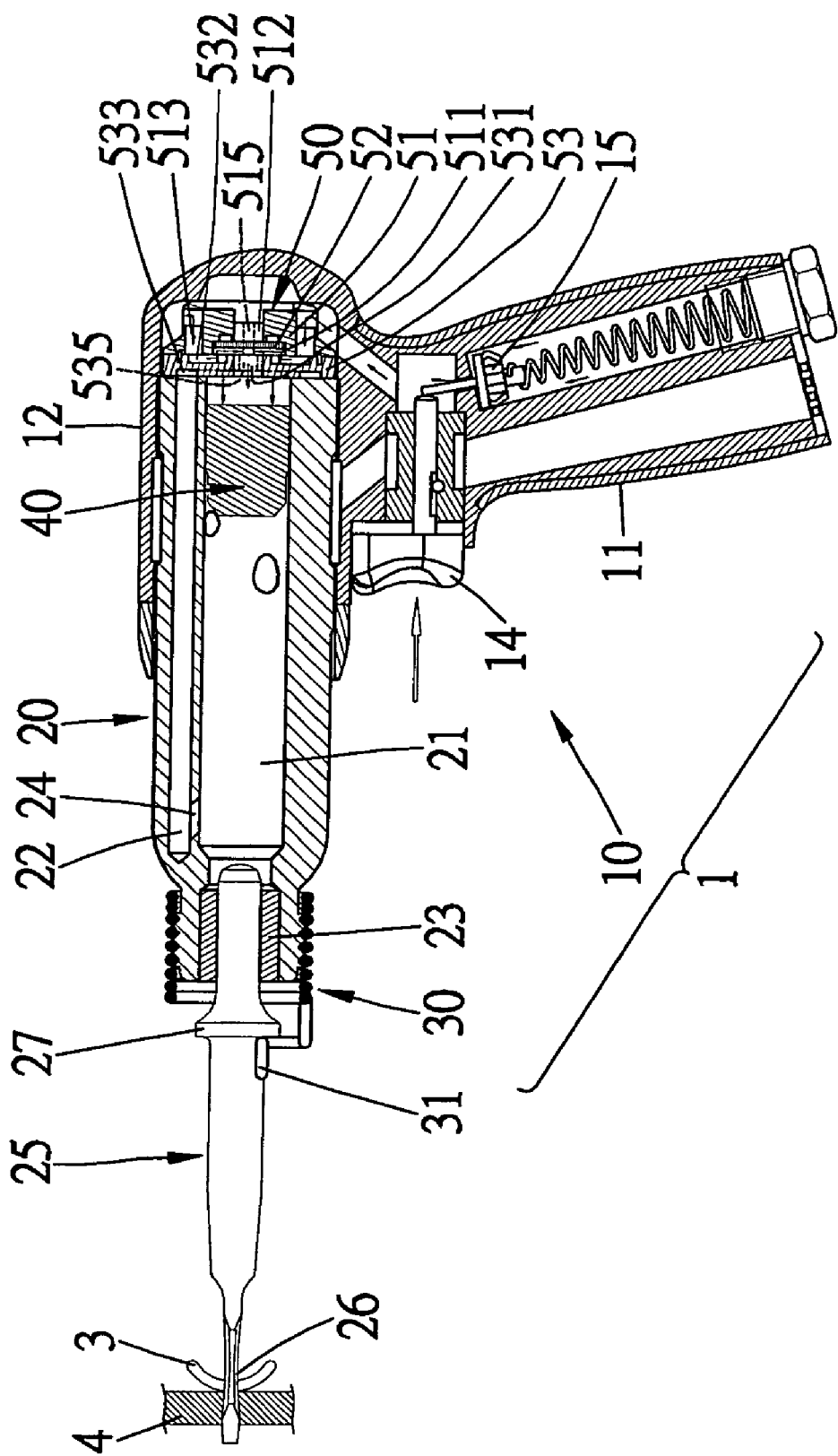
FIG. 3 is a cross-sectional view of the tire-patching tool shown in FIG. 2.

Referring to FIGS. 1 to 3, a tire-patching tool 1 includes a body 10, a barrel 20 connected with the body 10, a patch feeder 25 including a first end inserted in the barrel 20 and a second end for feeding a patch 3 into a cut in a tire 4, an elastic element 30 for connecting the patch feeder 25 with the barrel 20, a hammer 40 for striking the first end of the patch feeder 25 in the barrel 20, and an automatic valve 50 installed in the body 10 for controlling pressurized air for driving the hammer 40.

The body 10 is shaped like a gun. The body 10 includes a handle 11 and a cylinder 12 formed on the handle 1. In use, the handle 11 is connected with an air compressor (not shown). Thus, the pressurized air can flow into the handle 11 from the air compressor. A manual valve 15 is installed in the handle 11 for controlling the pressurized air flowing to the cylinder 12 from the handle 11. A trigger 14 is installed on the handle 11 and connected with the valve 15.

The barrel 20 includes a first passage 21, a second passage 22 and a third passage 24 for communicating the second passage 22 with the first passage 21. A first end of the barrel 20 is inserted in the cylinder 12. A tubular cushion 23 is fit in the first passage 21 at a second end of the barrel 20.

At a second end of the patch feeder 25 is formed a clip 26 for clipping the patch 3. An annular shoulder 27 is formed between the first and second ends of the patch feeder 25.

The elastic element 30 is a helical spring. A first end of the elastic element 30 is connected with the barrel 20. A second end of the elastic element 30 is connected with the annular shoulder 27. The second end of the elastic element 30 may be formed as a buckle 31.

The automatic valve 50 is installed in the cylinder 12. The automatic valve 50 can automatically be switched between an open position and a closed position. In the opening position, the automatic valve 50 allows the pressurized air to flow to the barrel 20 from the cylinder 12 in order to drive the hammer 40 to the patch feeder 25. In the closed position, the automatic valve 50 blocks the pressurized air from the barrel 20 in order to allow the hammer 40 to return from the patch feeder 25.

The automatic valve 50 includes a first shell or body 51, a second shell or body 53 connected with the first body 51 and a membrane 52 movable between the first body 51 and the second body 53.

The first body 51 includes a large axial passage 511, a small axial passage 512 communicated with the large axial passage 511, two passages 513 leading to an internal side from an external side or the periphery as shown, a passage 515 leading to the internal side from the external side, and two bosses 514 formed on the internal side.

The second body 53 includes an axial passage 531, a passage 535 leading to an internal side from an internal side, an annular groove 532 defined in the internal side, an annular groove 533 defined in the external side and communicated with the passage 535, and two recesses 534 defined in the internal side.

The bosses 514 are fit in the recesses 534 in order to firmly connect the first body 51 with the second body 53 and put the first body 51 in a correct position relative to the second body 53. The passages 513 are communicated with the annular groove 532. The annular groove 532 is communicated with the large axial passage 511. The large axial passage 511 is communicated with the axial passage 531. The passage 515 is communicated with the passage 535.

Referring to FIG. 3, the trigger 14 is pulled so that the pressurized air is allowed to enter the cylinder 12. The pressurized air flows into the passages 513 from the cylinder 12. The pressurized air flows into the annular groove 532 from the passages 513. The pressurized air flows into the large axial passage 511 from the annular groove 532, thus causing the membrane 52 to block the large axial passage 511 from the small axial passage 512. The pressurized air flows into the first passage 21 from the axial passage 531.

Figure 4:
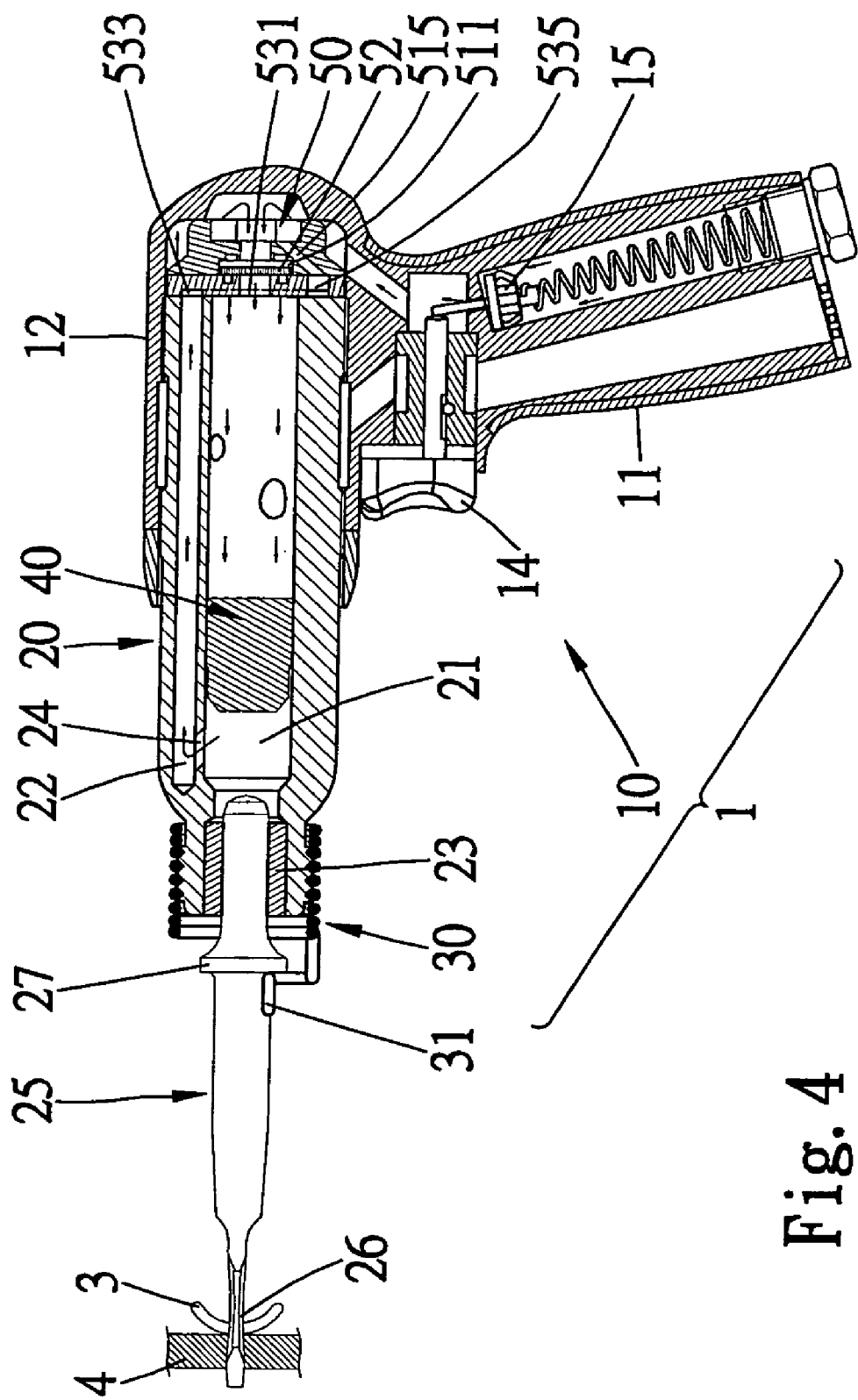
FIG. 4 is similar to FIG. 3 but shows the tire-patching tool in a different position relative to a tire.

Referring to FIG. 4, the pressurized air drives the hammer 40 toward the first end of the patch feeder 25 in the first passage 21. As driven, the hammer 40 causes air to flow into the second passage 22 from the first passage 21 through the third passage 24. The air flows into the annular groove 533 from the second passage 22. The air flows into the passage 535 from the annular groove 533. The air flows into the passage 515 from the passage 535. The air flows into the cylinder 12 from the passage 515. The air flows into the small axial passage 512 from the cylinder 12. The air flows into the large axial passage 511 from the small axial passage 512, thus causing the membrane 52 to block the large axial passage 511 from the axial passage 531. Thus, the pressurized air cannot flow through the valve 50.

Figure 5:
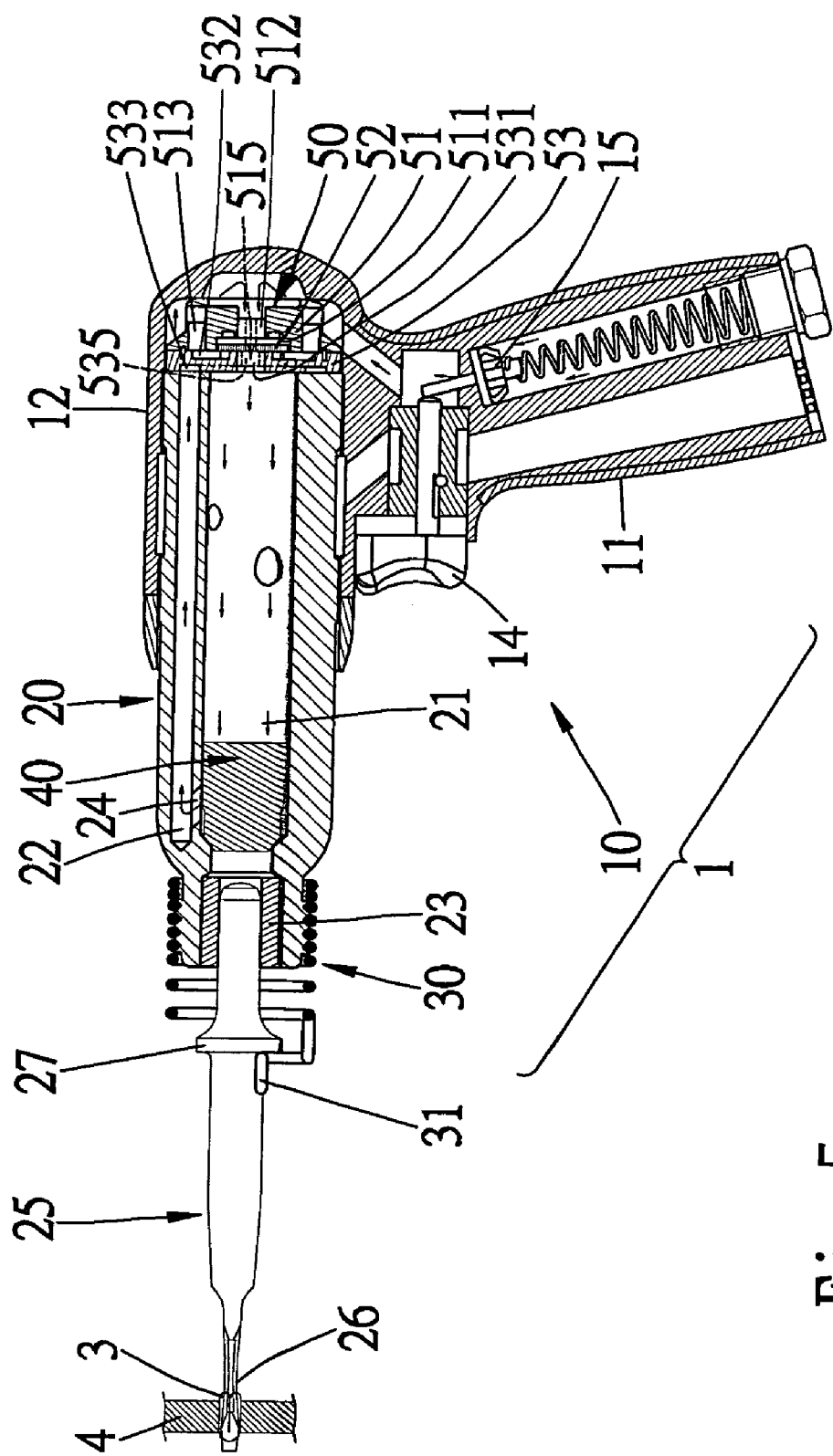
FIG. 5 is similar to FIG. 4 but shows the tire-patching tool in a different position relative to the tire.

Referring to FIG. 5, the hammer 40 strikes the first-end of the patch feeder 25. The clip 26 brings the patch 3 into the cut in the tire 4. The elastic element 30 is expanded.

Figure 6:
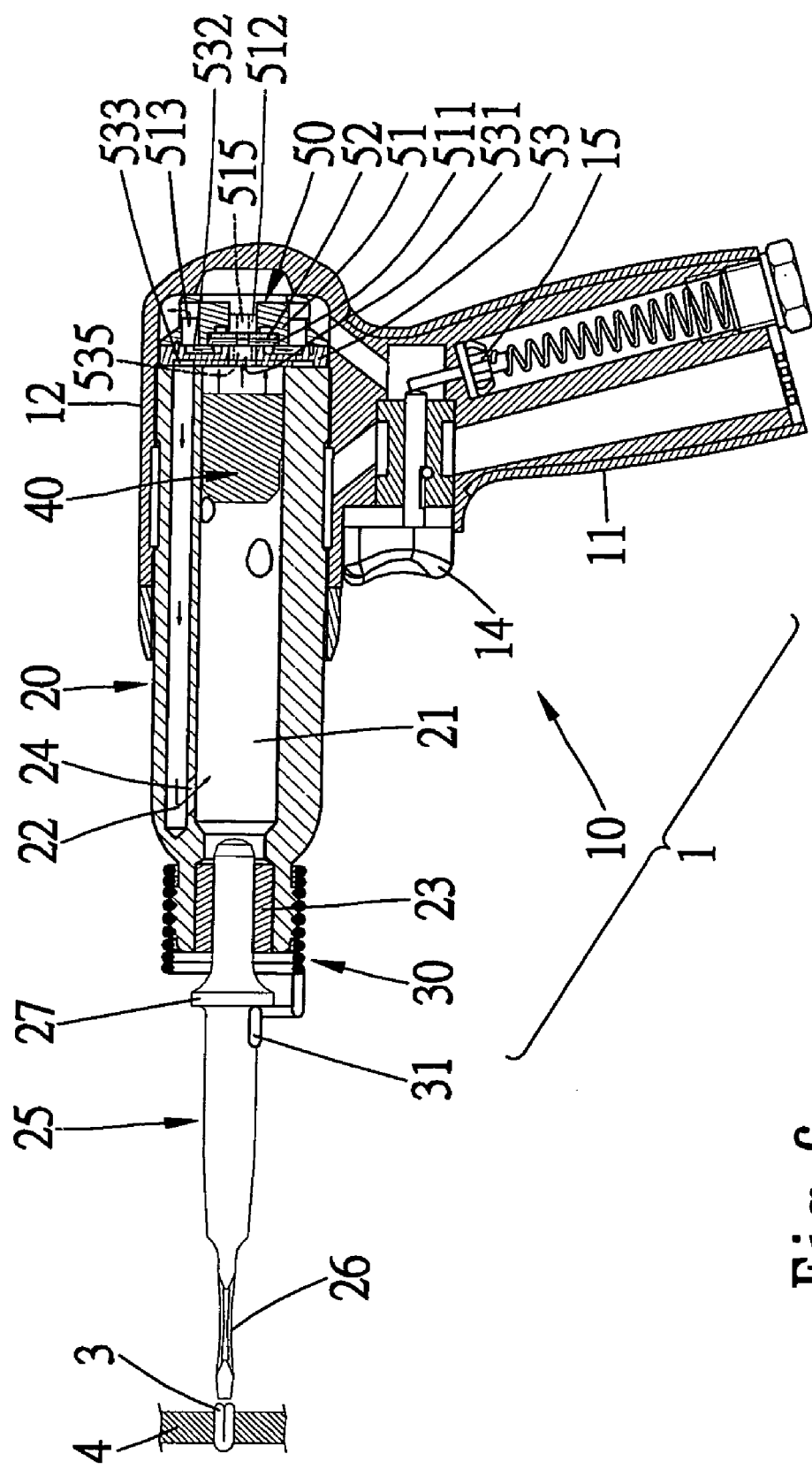
FIG. 6 is similar to FIG. 5 but shows the tire-patching tool in a different position relative to the tire.

Referring to FIG. 6, returning to its original status, the elastic element 30 pulls the clip 26 from the tire 4. The patch 3 is left in the cut. Thus, the tire 4 is patched. As the elastic element 30 returns to its original status, the annular shoulder 27 is encountered with and stopped by the cushion 23.

Figure 7:
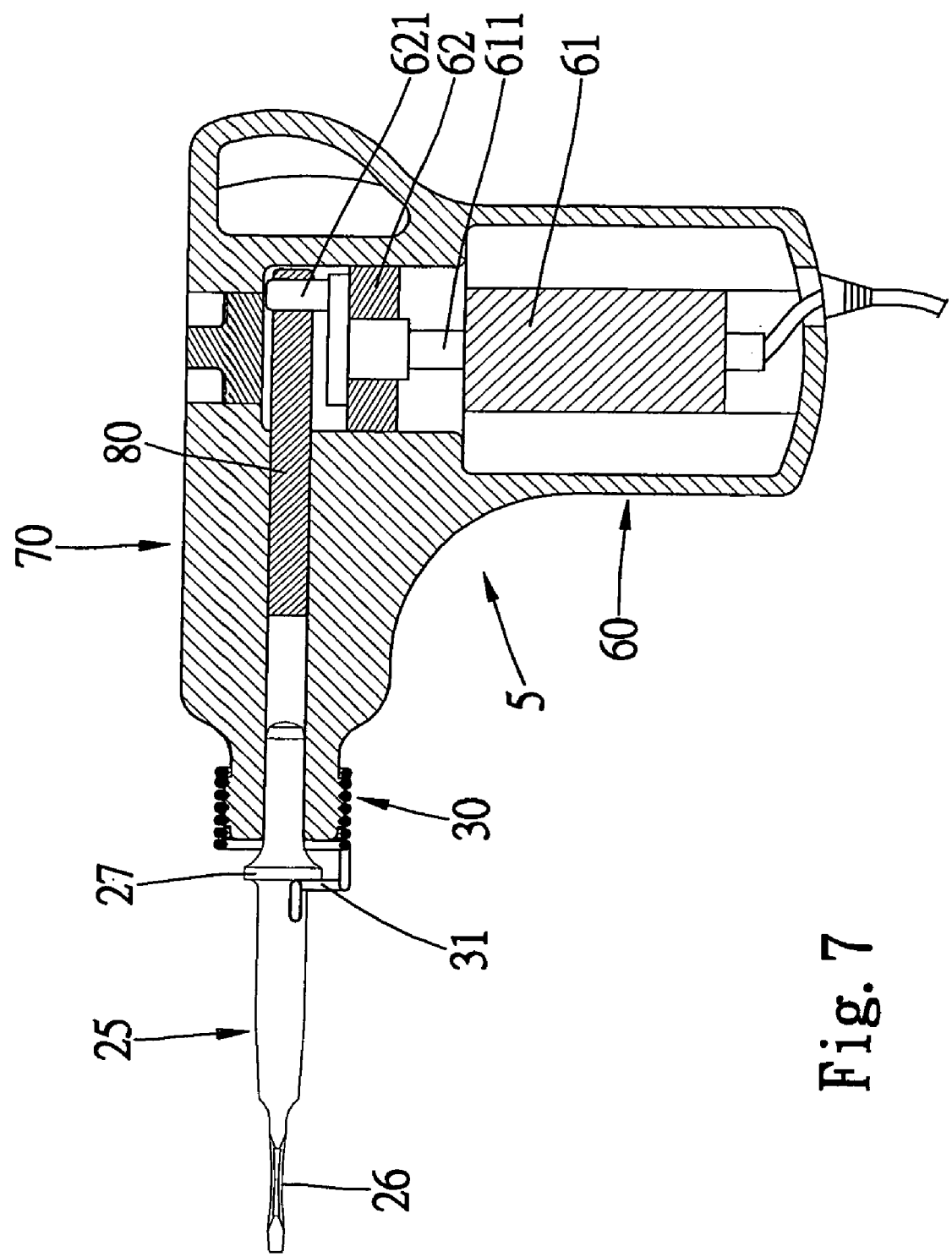
FIG. 7 is a cross-sectional view of a tire-patching tool according to a second embodiment of the present invention.
Figure 8:
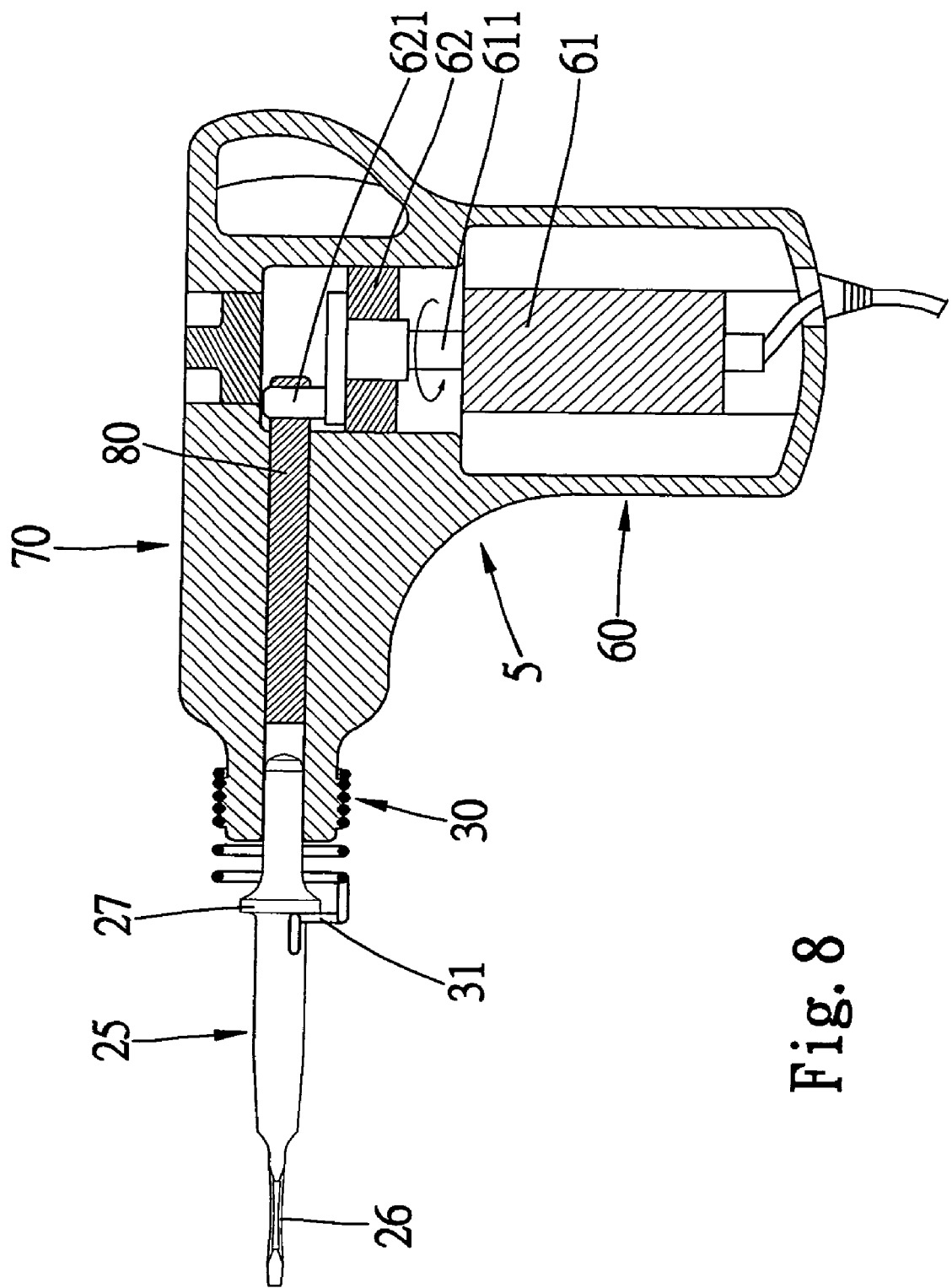
FIG. 8 is similar to FIG. 7 but shows the tire-patching tool in a different position.

Referring to FIGS. 7 and 8, according to the second embodiment of the present invention, the tire-patching tool includes a body 5 consisting of a handle 60 and a barrel 70 extending from the handle 60, a patch feeder 25 including a first end inserted in the barrel 70 and a second end for feeding the patch 3 into the cut in the tire 4, an elastic element 30 for connecting the patch feeder 25 with the barrel 70, a hammer 80 for striking the first end of the patch feeder 25 in the barrel 70, a motor 61, and a transmission 62 through which the motor 61 drives the hammer 80. The hammer 80 is longer than the hammer 40. The transmission 62 is a wheel connected with a mandrel 611 of the motor 61 on a first side and formed with an eccentric rod 621 on an opposite second side. The rod 621 is connected with the hammer 80. The operation of the motor 61 causes the rotation of the transmission 62 that in turn causes the reciprocating of the hammer 80.

The present invention has been described via detailed illustration of the first and second embodiments. Those skilled in the art can derive variations from the embodiments without departing from the scope of the present invention. Therefore, the embodiments shall not limit the scope of the present invention defined in the claims.

What is claimed is:

1. A pneumatic tire-patching tool comprising a body, a barrel connected with the body, a patch feeder including a first end inserted in the barrel and a second end for feeding a patch into a cut in a tire, an elastic element for connecting the patch feeder with the barrel, a hammer for striking the first end of the patch feeder in the barrel, and an automatic valve installed in the body for controlling pressurized air for driving the hammer, wherein the automatic valve can automatically switch between an open position and a closed position, wherein the automatic valve allows the pressurized air to flow to the barrel from the body in order to drive the hammer to the patch feeder in the open position, wherein the automatic valve blocks the pressurized air from the barrel in order to allow the hammer to return from the patch feeder in the closed position.

2. The pneumatic tire-patching tool according to claim 1 wherein the body includes a handle and a cylinder formed on and communicated with the handle.

3. The pneumatic tire-patching tool according to claim 2 wherein the handle is connected with an air compressor in use.

4. The pneumatic tire-patching tool according to claim 3 comprising a manual valve installed in the handle for controlling the pressurized air flowing to the cylinder from the handle.

5. The pneumatic tire-patching tool according to claim 4 comprising a trigger installed on the handle and connected with the valve.

6. The pneumatic tire-patching tool according to claim 1 wherein the barrel comprises a first passage in which the pressurized air drives the hammer in the open position of the automatic valve and a second passage communicated with the first passage so that the hammer drives feedback air to the body from the first passage through the second passage in order to move the automatic valve to the closed position of the automatic valve.

7. The pneumatic tire-patching tool according to claim 1 wherein the patch feeder comprises a clip formed at an end for clipping the patch.

8. The pneumatic tire-patching tool according to claim 6 comprising a tubular cushion fit in the first passage, wherein the patch feeder comprises an annular shoulder formed thereon for abutment against the tubular cushion.

9. The pneumatic tire-patching tool according to claim 1 wherein the elastic element is a helical spring comprising a first end connected with the barrel and a second end connected with the patch feeder.

10. The pneumatic tire-patching tool according to claim 6 wherein the automatic valve comprises a first shell, a second shell connected with the first shell and a membrane movable between the first shell and the second shell.

11. The pneumatic tire-patching tool according to claim 10 wherein the first shell comprises an external side, an internal side, a first axial passage, a second axial passage communicated with the first axial passage, at least one side passage leading to the internal side from the external side and a feedback passage leading to the internal side from the external side, wherein the second shell comprises an external side, an internal side connected with the internal side of the first shell, an axial passage, a passage leading to the internal side from the internal side, an annular groove defined in the internal side and an annular groove defined in the external side and communicated with the passage, wherein the second shell is connected with the first shell so that the pressurized air flows in the side passage of the first shell, the annular groove defined in the internal side of the second shell, the large axial passage of the first shell and the first passage of the barrel, thus causing the membrane to block the large axial passage from the small axial passage of the first shell, and that the feedback air flows in the second passage of the barrel, the annular groove defined in the external side of the second shell, the passage of the second shell, the feedback passage of the first shell, the body, the small axial passage of the first shell and the large axial passage of the first shell, thus causing the membrane to block the large axial passage of the first shell from the axial passage of the second shell.

12. The pneumatic tire-patching tool according to claim 11 wherein the first shell comprises a plurality of side passages.

13. The pneumatic tire-patching tool according to claim 10 wherein the first shell comprises two bosses formed thereon, wherein the second shell comprises two recesses defined therein for receiving the bosses of the first shell of the automatic valve.

14. An electric tire-patching tool comprising a body, a patch feeder with a first end inserted in the body and a second end for feeding the patch into a cut in a tire, a hammer for striking the first end of the patch feeder in the body, a motor, and a transmission through which the motor drives the hammer, wherein the transmission comprises a wheel centrally connected with the motor on a first side and eccentrically connected with the hammer on an opposite second side so that the operation of the motor causes the rotation of the wheel that in turn causes reciprocating of the hammer.

15. The electric tire-patching tool according to claim 14 wherein the transmission comprises a rod formed on the second side of the wheel and connected with the hammer.

16. The electric tire-patching tool according to claim 14 comprising an elastic element for connecting the patch feeder with the barrel.

17. The electric tire-patching tool according to claim 14 wherein the body comprises a handle in order to receive the motor and a barrel extending from the handle in order to receive the hammer.

18. The electric tire-patching tool according to claim 14 wherein the patch feeder comprises a clip formed at an end for clipping the patch.

* * * * *